United States Patent
Cote et al.

(10) Patent No.: US 12,240,433 B2
(45) Date of Patent: Mar. 4, 2025

(54) METHOD FOR ESTIMATING THE WATER LEVEL ON A ROADWAY WHEN A TIRE IS RUNNING

(71) Applicant: COMPAGNIE GENERALE DES ETABLISSEMENTS MICHELIN, Clermont-Ferrand (FR)

(72) Inventors: Remi Cote, Clermont-Ferrand (FR); Florian Bremond, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 390 days.

(21) Appl. No.: 17/631,665

(22) PCT Filed: Jul. 20, 2020

(86) PCT No.: PCT/FR2020/051306
§ 371 (c)(1),
(2) Date: Jan. 31, 2022

(87) PCT Pub. No.: WO2021/019148
PCT Pub. Date: Feb. 4, 2021

(65) Prior Publication Data
US 2022/0274568 A1   Sep. 1, 2022

(30) Foreign Application Priority Data
Aug. 1, 2019 (FR) ........................... 1908820

(51) Int. Cl.
*B60W 40/06* (2012.01)
*B60T 8/172* (2006.01)
*G01B 17/02* (2006.01)

(52) U.S. Cl.
CPC ........... *B60T 8/1725* (2013.01); *B60W 40/06* (2013.01); *G01B 17/02* (2013.01); *B60T 2210/13* (2013.01)

(58) Field of Classification Search
CPC .... B60T 8/1725; B60T 2210/13; B60T 8/172; B60W 40/06; B60W 40/064; G01B 17/02
(Continued)

(56) References Cited

U.S. PATENT DOCUMENTS 5,765,119 A   6/1998  Otabe et al.
7,248,958 B2  7/2007  Watanabe et al.
(Continued)

FOREIGN PATENT DOCUMENTS

DE   102014103843 A1 *  5/2015  .............. B60T 8/172
DE   102015106401 A1    10/2016
(Continued)

OTHER PUBLICATIONS

International Search Report dated Oct. 21, 2020, in corresponding PCT/FR2020/051306 (5 pages).
(Continued)

*Primary Examiner* — Robert R Raevis
(74) *Attorney, Agent, or Firm* — VENABLE LLP (57) ABSTRACT

A method for estimating a water height on a roadway where a tire of a vehicle is running, the mounted assembly being placed in a wheel arch of the vehicle, comprises the following steps: fixing a sensor onto the vehicle; obtaining a frequency signal from the sensor corresponding to the running of the vehicle at speed V on the roadway covered with a water height heau; isolating a part of the frequency signal, bounded by two strictly increasing frequencies, which is sensitive to the height heau; determining an energy vector linked to the part of the frequency signal; and obtaining the water height on the roadway using a function (Continued)

taking account of the energy vector and the speed V of the vehicle. The sensor is a microphone, and the part of the frequency signal extends at least partly beyond 4 kHz.

15 Claims, 5 Drawing Sheets

(58) Field of Classification Search
USPC .... 73/146, 290 R, 291, 290 V, 865.8, 432.1; 33/1 R, 1 P, 700, 701; 181/141; 381/86; 367/13, 99–116; 340/425.5, 463, 612, 340/615, 619, 62
See application file for complete search history.

(56) References Cited

U.S. PATENT DOCUMENTS

| | | |
|---|---|---|
| 10,160,454 B2 | 12/2018 | Barthel et al. |
| 10,365,248 B2 | 7/2019 | Paturle et al. |
| 11,498,570 B2 | 11/2022 | Chazal et al. |
| 2004/0138831 A1 | 7/2004 | Watanabe et al. |
| 2016/0349219 A1 | 12/2016 | Paturle et al. |
| 2018/0065640 A1 | 3/2018 | Barthel et al. |
| 2019/0143758 A1* | 5/2019 | Niemann .............. B60C 11/246 73/146 |
| 2020/0189463 A1* | 6/2020 | Kunz ...................... G01S 17/89 |
| 2023/0168079 A1 | 6/2023 | Grimaldi et al. |

FOREIGN PATENT DOCUMENTS

| | | |
|---|---|---|
| DE | 102018100117 A1 * | 7/2019 |
| FR | 3014064 A1 | 6/2015 |
| JP | 6-138018 A | 5/1994 |
| JP | 6-174543 A | 6/1994 |
| JP | 8-184533 A | 7/1996 |
| JP | 8-298613 A | 11/1996 |
| JP | 2004-168286 A | 6/2004 |
| WO | 2015/092253 A1 | 6/2015 |
| WO | 2017/198972 A1 | 11/2017 |

OTHER PUBLICATIONS

K. Naab, et al., "Sensor Systems and Signal Processing for Advanced Driver Assistance", Smart Vehicles, Swets and Zeitlinger, Lisse, The Netherlands, pp. 69-97 (1996).

* cited by examiner

METHOD FOR ESTIMATING THE WATER LEVEL ON A ROADWAY WHEN A TIRE IS RUNNING

FIELD OF THE INVENTION

The present invention relates to a method for estimating water height on a roadway in real time on which the tyre of a vehicle is running.

TECHNOLOGICAL BACKGROUND

In the field of motor vehicle safety, it is well known that a roadway covered with a layer of water 0.2 millimetres high can degrade the grip condition of the tyre on the roadway. A reduction of grip of approximately 30% is noted compared to a dry road in certain conditions. Thus, the vehicle running on a wet roadway sees its braking distance considerably increased. Nevertheless, the driver of the vehicle is not always aware of the fact such a thin layer of water reduces the grip of the vehicle by so much. In fact, for a thickness less than 0.5 millimetre, the water is not sprayed behind other vehicles. In the absence of this mist, the driver has the impression that the road is dry enough to allow the vehicle to run at the same speed as on a totally dry road.

Furthermore, vehicles are these days equipped with many safety devices, the aims of which are to warn the driver of a hazardous situation, or even replace the driver. There are for example automatic speed control devices called ACC (Adaptative Cruise Control) or even devices for managing the safety distance of the vehicle with respect to the vehicle in front. Currently, to take account of the wetness of the road, the safety devices of ACC type are based on the presence of sprays of water on the windshield to adapt their reaction to the state of the road and increase the separating distance with the vehicle in front. However, when the vehicle is running on a wet ground with a water height of less than 0.5 millimetre, no splash of water reaches the windshield. The safety device then manages the driving of the vehicle as if it were running on a dry road even though the grip has already greatly decreased.

Also known are other sensors for measuring the height by the emission of an infrared ray which is reflected by the coating of the roadway after having been refracted by its passage through the layer of water. However, these metrological devices are highly sensitive to the colour and the temperature of the coating of the roadway, which renders them somewhat imprecise for a daily application. Furthermore, depending on the roughness of the ground to a millimetric scale corresponding to the macrotexture, the measurement of the water height obtained is influenced by this characteristic.

Also known are vibratory sensors placed on a flexible plate which are made to vibrate under the impact of the splashes generated by the movement of the tyre on the wet roadway. However, these devices, because of their location facing the trajectory of the water splashes generated by the tyre when running, are fragile, notably on gritted roadways where the tyre can capture then expel grit via the pattern of hollows of its tread. These sensors are based on the vibratory level of the plate excited by the sprays. The vibratory analysis is in the low and medium frequency range lying between 100 and 3000 Hz sensitive to the deformations of the panels of the vehicle, such as the wheel arch for example. It is then difficult to isolate, in the vibratory response, that which is due to the vibrations of the panels generated by the excitations of the vehicle from those originating from the splashes. To remedy this problem, the sensor is placed close to the splashes on a dedicated plate.

The invention consists of a method for estimating the water height on the roadway where the tyre is running which is both reliable and accurate, that has a discriminatory power of the order of a tenth of a millimetre of water height, and that is insensitive to the response of the vehicle and unintrusive for the vehicle.

SUMMARY OF THE INVENTION

The invention relates first of all to a method for estimating a water height on a roadway where a tyre of a mounted set of a vehicle is running, the mounted set being placed in a wheel arch of the vehicle, preferentially a wheel arch linked to the first axle of the vehicle with respect to the conventional direction of advance of the vehicle. The method comprises the following steps:
  Fixing a sensor onto the vehicle; preferably linked with the wheel arch.
  Obtaining a frequency signal from the sensor corresponding to the running of the vehicle at speed V on the roadway covered with a water height heau;
  Isolating a part of the frequency signal, bounded by two frequencies F1 and F2, F1 being lower than F2, which is sensitive to the water height heau;
  Determining an energy vector linked to the part of the frequency signal;
  Obtaining the water height on the roadway using a function taking account of the energy vector and the speed V of the vehicle;
The method is characterized in that the sensor is a microphone and in that the part of the frequency signal extends at least partly beyond 4 kHz, preferentially beyond 7 kHz and very preferentially beyond 10 kHz.

The term "water height" is understood here to mean the average thickness of the layer of water delimited on the one hand by the free surface of the layer of water with the air and, on the other hand, the outer surface of the roadway. Thus, on a roadway that is perfectly smooth to a macroscopic scale of the order of a millimetre, the water height corresponds to the thickness of the layer of water uniformly distributed on the outer surface of the roadway. And, for a roadway that is rough on a millimetric scale, called macrotextured, the water height corresponds to the average thickness of the layer of water situated on top of the outer surface of the roadway over a specific extent of the roadway.

The method employs a microphone as sensor in order to record the sound signature of the interaction between the layer of water and the tyre up to several thousands of hertz, and not just the vibratory signature of a panel subjected to the excitation of the splashes which is bounded at 3000 Hz or 4000 Hz. Thus, the phenomenon comprises different events such as the filling of the pattern of hollows of the tread of the tyre with water, the expulsion thereof from the pattern of hollows, the spraying of the droplets of water in the air, the impact of these droplets of water on the wall of the wheel arch and the acoustic radiation of this panel which is made to vibrate. Furthermore, the sound signature of the displacement of the water, both the flux, like the wavefront in front of the tyre which is displaced at the speed of the vehicle or the water evacuation waves on the sides of the tyre, and the reflux which occurs on the rear of the tyre over great water heights are also acoustic sources of the physical phenomenon. All of these phenomena depend on the quantity of water set in motion by the interaction with the tyre, they are linked directly to the water height on the roadway ensuring the accuracy of the method.

The method focuses on a frequency band situated in the high frequencies at least partially or totally above 4 kHz where the aerial transmission of the noise is predominant compared to the solid or vibratory transmission of the vehicle, thus minimizing the vibro-acoustic response of the panels and highlighting the other phenomena. And, the sensitivity of the sound response in the high frequencies is higher than that of the vibratory response in low and medium frequencies. Furthermore, this frequency band highlights the acoustic events of the interaction between the tyre and the layer of water. The selection of a frequency band sensitive to the water height where the physical events of the interaction between the layer of water and the tyre will have an emergent sound response reinforces the reliability and the accuracy of the method. However, the physical phenomenon will be highlighted more at higher frequencies because of the sound level of the vehicle which decreases with the frequency. Thus, the sensitivity of the method is enhanced by isolating blocks in the highest frequencies. Preferentially, the frequency band is situated in the high frequencies at least partially or totally above 7 kHz, very preferentially above 10 kHz.

The fact that a frequency band lying between two bounds F1 and F2, F1 being lower than F2, is selected, makes it possible to compare the sound responses to one another and therefore estimate the water height on the roadway.

However, in order to reinforce the accuracy of the method by limiting the impact of the conventional sound decrease of a vehicle, it is useful to construct a frequency signal that is rectified by comparing the frequency signal from the sensor with a characteristic curve of the frequency signal which incorporates the decrease in the frequency signature of the vehicle.

The location of the sensor on the vehicle and in particular in the wheel arch also enhances the reliability of the method. In fact, because of its form, a concave surface, the wheel arch serves to amplify the acoustic sources of the phenomenon by the containment of the acoustic waves in a small volume. In addition, reflections of these waves in this confined space concentrate the acoustic energy in this space. Finally, the wheel arch is a zone of protection of the sensor with respect to other sound sources such as, for example, the aerodynamic flow of the air around the vehicle when running.

The present of the layer of water on the roadway, whatever the rough nature of the ground, ensures like treatment of the acoustic waves by this surface. Thus, the accuracy of the method is reinforced. Furthermore, the intrusion of a microphone in the wheel arch is easy by exploiting the thin wall of the wheel arch to be able to place the non-active elements of the sensor such as the power supply connections on the other side of the wheel arch, thus avoiding placing the greater part of the sensor in contact with the water. Finally, the location of the sensor is as close as possible to the acoustic sources of the physical phenomenon while being protected physically by the structure of the vehicle. The microphone can be situated entirely behind the wall of the wheel arch and in this case the received signal will be attenuated by the acoustic insulation of the wheel arch and it is preferable to situate the active part of the microphone in proximity to the wall. However, the active part of the microphone can also be placed in the volume delimited by the wheel arch where the mounted assembly is located, it is then preferable to conceal the active part of the sensor behind a wall that has a multitude of perforations. These perforations are dimensioned to protect the active part of the sensor with respect to the droplets of water while allowing the acoustic waves to pass without being disturbed. The range of high frequencies used favours this dual effect of the perforated wall.

The determination of a block is done using the rectified frequency signal. The analysis of this rectified frequency signal makes it possible to determine blocks by comparing the frequency signal to the characteristic curve of the frequency acoustic response of the vehicle. Then, for each determined block, a characteristic value of the block should be evaluated. Finally, this characteristic value simply has to be evaluated with respect to a predefined threshold in order to know whether the frequency band associated with the block is retained or not in the part of the frequency signal. In the affirmative, the frequency band of the block is selected to isolate the frequency signal on this frequency band in order to constitute a sequence of the part of the frequency signal. Necessarily, the part of the frequency signal is bounded by the extrema of the frequency bands selected on the rectified frequency signal.

From the bounded frequency signal that has been isolated, it is possible to determine a series of energy criteria which will supply an energy vector. This energy vector is defined on at least one dimension. The choice of an energy criterion is due to the physical phenomena that are sought to be learned. In the range of the high frequencies where the physical phenomenon applies, the energy is the most discriminatory indicator.

Finally, the running speed causes the quantity of water in motion due to the interaction with the tyre to be multiplied. The speed of the vehicle also modifies the conditions of the physical events of the interaction by increasing, for example, the quantity of water set in motion or the speed of propagation of the drops of water ejected from the tyre, which directly increases the impact energy of these splashes on the wall of the wheel arch. Consequently, the taking account of the running speed of the vehicle is essential for accurately estimating the water height on the roadway. In fact, the speed directly influences several events of the physical phenomenon.

The determination of the height is obtained via a function, for example a correlation function, linking the water height, the energy vector and the speed of the vehicle, which is relevant for low water heights regardless of the state of the tyre for sculpted tyres and regardless of the macrotextured nature of the roadway. The function is linked to the vehicle or to a family of the vehicles to which the vehicle is related. In fact, the sound measurement is performed outside the vehicle in proximity to the mounted assembly. Whatever the motor vehicle, these wheel arches exist and their dimensions are very similar. However, some vehicles have particular features in these wheel arches like the absence of sound proofing for cheap vehicles, or like their ground clearance which influences the loudspeaker effect of the wheel arch.

Preferentially, the frequency signal obtained is the Power Spectral Density, called PSD, of a discretised temporal signal from the sensor acquired while the vehicle is running.

Advantageously, the energy vector comprises the integral function of the DSP, possibly rectified, between the frequencies F1 and F2.

This is a rapid and inexpensive way of obtaining the acoustic response of the phenomenon where the sampling frequency of the temporal signal must be higher than 8 kHz. The running of a tyre on a wet roadway is not an ephemeral phenomenon, the running time thereof is long with respect to the acquisition of the temporal signal. Obviously, the longer this signal is, the more there is the possibility of statically discarding transient phenomena which would disturb the acoustic response. Given that the physical phenomenon is continually cyclic and that the acquisition of the temporal signal is only an extraction of a part of this physical phenomenon, the power spectral density is a good tool for extracting energy information from the signal which is relevant.

The energy vector comprises, for example, the summing of the products obtained by the amplitude of the PSD discretised by the frequency pitch between the contiguous discrete values for all the discrete values of the sound response retained between F1 and F2. Obviously other more elementary energy criteria constructed, for example, on the real part or on the imaginary part of the frequency signal or constructed from a frequency signal corresponding to the temporal response over a finite number of cycles of the physical phenomenon can be employed.

Obviously, if the part of the frequency signal is defined piecewise, the analysis should be performed on each continuous piece and the energy of all the pieces summed.

According to a particular embodiment, the part of the frequency signal is limited to at least one block whose characteristic value is above a threshold relative to the frequency signal.

By focusing the analysis of the sound response on one or more blocks in particular, the sensitivity of the method is enhanced and, thereby, so too the discriminating power of the method by retaining only the blocks that have the greatest sensitivity to the water height. This selection of the block or blocks is performed using a metric, the characteristic value of the block and a threshold linked with this metric. The threshold is necessarily linked to the frequency signal since the latter is not constant. This makes it possible to retain only the blocks that offer a sound weight that is significant with respect to the overall response of the vehicle.

The selection of a block makes it possible to make the method robust since the estimation of the water height will be less impacted by a spot signal linked to the signature of the vehicle for example. Furthermore, the method is much more sensitive to the physical phenomena which are more wideband than is sought to be isolated. Thus, the reliability of the method is clearly enhanced.

According to a specific embodiment, the step for isolating a part of the frequency signal comprises the construction of a frequency signal rectified as being the comparison between the frequency signal and a characteristic curve of the frequency signal.

In order to facilitate the selection of the blocks for constructing the part of the frequency signal, it is preferable to construct a rectified frequency signal in order to give an equivalent weight to the various blocks of the sound response by taking account of the decrease in the sound level of the vehicle proportional to the frequency. The measured frequency signal should then be compared to the characteristic decreasing curve to obtain a rectified frequency spectrum of the sound level of the vehicle. This comparison can be made by either the difference or the ratio between the two elements of the comparison.

According to a very specific embodiment, the characteristic curve of the frequency signal is a curve continually decreasing as a function of the frequency beyond 4 kHz.

It is an elementary model that is sufficient to identify the blocks and which can be obtained simply by a simple piecewise linear regression of the frequency signal provided that one of the bounds of a piece is around 4 kHz. The natural decrease of the sound signal of the vehicle facilitates the identification of the slope of the characteristic curve. An identification on a sound response on a dry road can suffice for this evaluation. On the other hand, a characteristic point should be identified on the measurement sound signal that will be called 4 kHz reference point in order to completely determine the characteristic curve. In fact, the sound amplitude of this characteristic point depends both on the running speed of the vehicle but also on the water height, even on the nature of the ground. This characteristic point can be the value of the 4 kHz sound response or the average of the discretisations of the frequency signal over a band of frequencies around 4 kHz.

Very advantageously, the at least one block of the rectified frequency signal is delimited by the crossing of a specific value by the rectified frequency signal.

In fact, the sound response of the vehicle whether running on a dry roadway or one covered with water decreases in frequency. In the case of a logarithmic scale representation of the sound response of the vehicle, the characteristic curve of the vehicle is like a linear or piecewise linear curve beyond a frequency of 4 kHz. This decrease is characteristic of the acoustic response of the vehicle. In order to identify the slope of this characteristic curve, it is for example possible to use a method of linear regression over a sound spectrum of the vehicle in running condition regardless of the roadway and the wet or dry nature of the coating. To construct the characteristic curve associated with the frequency signal, it is then sufficient to align the starting point of the curve on the frequency signal.

The rectified frequency signal is then obtained, in a logarithmic scale, in the form of the difference between the frequency signal and the characteristic curve of the frequency signal. Two contiguous passes through the zero specific value of the rectified frequency signal, expressed in logarithmic scale, delimits a block of the rectified frequency signal. In the case of a linear scale representation of the frequency signal, the construction of the rectified frequency signal is performed by the ratio between the frequency signal and the characteristic curve, both in linear scale. And the specific value for delimiting the blocks of the rectified frequency signal is the unity value.

According to a specific mode of representation, the characteristic value of the at least one block lies in the group comprising maximum value, medium value, median value.

In order to retain the frequency band of a block of the frequency signal, the block of the frequency signal should be classified. This classification first of all involves the evaluation of a characteristic metric of the block of the frequency signal. A simple metric like the maximum value of the frequency signal or its average or median value over the frequency band of the block is suitable for characterizing the block. This step is highly effective on the rectified frequency signal.

These characteristic values can be expressed equally in linear scale and in logarithmic scale or any other type of representation of the frequency signal.

According to a very specific embodiment, the frequency signal being expressed in logarithmic scale, the threshold is the value 3 dB, preferentially the value 4 dB, very preferentially the value 5 dB.

These thresholds show a notable difference of the block with respect to the sound response of the vehicle. Consequently, the weight of this block in the sound energy of the response of the vehicle is high. Consequently, if the characteristic value of the block is above this threshold, the frequency band of the block should be retained to delimit a sequence of the part of the frequency spectrum. The energy vector is then sensitive to the water height. This step is highly effective on the rectified frequency signal.

Advantageously, a sensitivity step of the frequency bands of the frequency signal to the water height is performed in a learning step in which the vehicle equipped with the microphone runs on a roadway having at least two water heights that can be differentiated.

It is useful for the running operations to be performed on water heights that can be differentiated and are controlled, of the order of a tenth of a millimetre, in order to evaluate the capability of the method to detect such a difference. Preferentially, the vehicle runs in similar running conditions: linear speed, dynamic load of the vehicle, wind, ambient temperature on the same ground or on ground of equivalent nature. Furthermore, this sensitivity step must be performed over various running speed ranges. This sensitivity study makes it possible to identify the correlation function that allows the water height to be identified from the running speed and from the energy criteria linked to the part of the frequency signal sensitive to the water height. This corresponds to a calibration of the frequency signal and of the associated energy criteria for each frequency band of the frequency signal to the water height on the roadway.

According to a very specific embodiment, the tyre comprising an identification vector, the method comprises a step of obtaining of the identification of the tyre in order to obtain at least one geometrical characteristic of the tyre, and the function of the step the obtaining of the water height takes account of the at least one geometrical characteristic of said tyre.

The tyre is equipped with at least one identification vector in its new state, for example through a label. It can also contain an identification vector which follows it throughout its life in the form of a physical and visible vector which is attached to it like a barcode, a QR code, or an invisible vector like an electronic device of RFID (the acronym for Radio Frequency Identification) type or TMS (acronym for "Tyre Mounted Sensor") type. The content of all of these identification vectors is the identification of the tyre. This identification of the tyre can also be available directly on the vehicle through manual, optical or radio frequency input of these various vectors. From this identification, a certain number of characteristics of the tyre and in particular geometrical characteristics are accessible. It is thus possible to have access to the dimensions of the tyre including the width of the tyre which will directly influence the width of the ejection zone and of the impact zone of the water droplets. It is also possible to have access to the geometry of the pattern of hollows of the tread of the tyre which will also modify the spraying and the impact zone of the water droplets imprisoned in the pattern of hollows of the tyre when running on the wetted roadway. For example, a tyre of summer type has, as its main pattern of hollows, longitudinal furrows which will mostly generate a longitudinal spraying of the water droplets by these furrows. On the other hand, a winter tyre will have as pattern of hollows a succession of V-shaped hollows which will also generate sprays of water at 45 degrees thus modifying the impact zone of the water droplets on the wall of the wheel arch.

According to a preferential embodiment, the method comprises a step of obtaining of the state of wear of the tyre and the function of obtaining of the water height takes account of the state of wear of the tyre.

If the geometrical characteristics linked to the pattern of hollows of the tread are taken into account, it is also necessary to address the state of wear of the tyre which is reflected by a mean variation of the height of the tread of the tyre. The wear begins necessarily by trimming the outer surface of the tread. It can influence the geometrical characteristics of the pattern of hollows such as, for example, the zone of expulsion of the water droplets by the appearance of new elements of the pattern of hollows initially concealed in the new state, or the volume of water ejected by the saturation of the available pattern of hollows because of the wear of the tread.

This state of wear of the tyre can be obtained by devices situated in the tyre such as, for example, resistive or capacity sensors in the tread or devices external to the tyre such as drive-over scanners or a manual measurement during an inspection of the vehicle whose information was communicated to the vehicle or on a server by associating it with the identification of the tyre. Consequently, taking account of the state of wear of the tyre in the function linking the water height on the roadway to the other parameters may be necessary for certain tyres like for example those that have hollows concealed in the tread which emerge as the tyre wears. Modification of the pattern of hollows with the wear of the tyre then influences the sound signature of the physical phenomenon. Furthermore, the wear of the tyre has a slow temporal dynamic with respect to the variations of the water height on the roadway. This step of obtaining of the state of wear of the tyre can therefore be performed well before the measurements for evaluating the water height on the roadway.

According to another preferential embodiment, the method comprises a step of obtaining of the texture of the roadway, preferentially the MTD (acronym of Mean Texture Depth) of the ground on a millimetric scale, and the function of obtaining of the water height takes account of the texture of the roadway.

This is one of the parameters that can influence the evaluation of the water height on the roadway. To this end, the macrotexture of the ground, that is to say the texture on a millimetric scale, is sufficient to qualify the roadway with respect to its interaction with the water. The MTD can be evaluated according to the standard NF EN 13036-1.

The texture of the roadway can be obtained for example using a mapping of a texture of the roads associated with the position of the vehicle via, for example, a GPS (Global Positioning System) indication. It is also possible to employ the device presented in the application WO2015092253A1, also including a microphone on the vehicle, allowing the state of the texture of the roadway to be related to a class. Since the influence of the texture of the roadway on the evaluation of the water height is secondary, qualitative and non-quantitative information on the texture of the roadway is sufficient to incorporate a fixed correction for each class of texture on the evaluation of the water height. Finally, the step of obtaining of the texture of the roadway can also correspond to the analysis of a noise spectrum, recorded by a microphone mounted on the vehicle as close as possible to the roadway, for example, the wheel arch or the bumper, over a frequency band lower than 4 kHz, for example between 200 and 2000 Hz or 500 and 1000 Hz. This noise spectrum is represented by a mean level, expressed for example using the RMS (Root Mean Square) value. Depending on the qualitative level of this mean level and the knowledge of the speed of the vehicle, it is possible to deduce therefrom a class of the texture of the road even on wetted ground.

According to a specific embodiment, the fixing of the sensor takes place in the wheel arch, more specifically the fixing of the sensor takes place in the rear part of the wheel arch with respect to the plane OYZ of the mounted set, preferentially in an angular sector lying between 270° and 315° with respect to the axis Y of the geometrical reference frame of the tyre.

The term geometrical reference frame of the tyre named OXYZ is understood here to mean the reference frame associated with the tyre consisting of a centre O situated at the intersection of the natural axis of rotation of the tyre and the median plane of the tyre. This reference frame comprises an axis Z, or vertical axis, corresponding to the vertical direction with respect to the ground on which the tyre is running, an axis X, called longitudinal axis, directed in the direction of displacement of the tyre when running in a straight line which is at right angles to the axis Z and parallel to the ground, and an axis Y, or transverse axis, directed according to the natural axis of the tyre which is at right angles to the axes X and Z to constitute a fixed direct orthogonal reference frame linked to the tyre.

This preferred positioning of the microphone has the advantage of positioning the microphone far from the zone of impact of the water droplets on the wall of the wheel arch while being close to this source as well as other sound sources. The distance makes it possible to ensure the physical integrity of the sensor notably in the case of ejection of grit or solid objects by the pattern of hollows of the tread. The proximity with the other sound sources makes it possible not to mask their response with respect to that of the impact of the water droplets.

BRIEF DESCRIPTION OF THE DRAWINGS

The invention will be better understood on reading the following description. This application is given purely as an example and with reference to the attached figures in which.

DETAILED DESCRIPTION OF EMBODIMENTS

Figure 1:
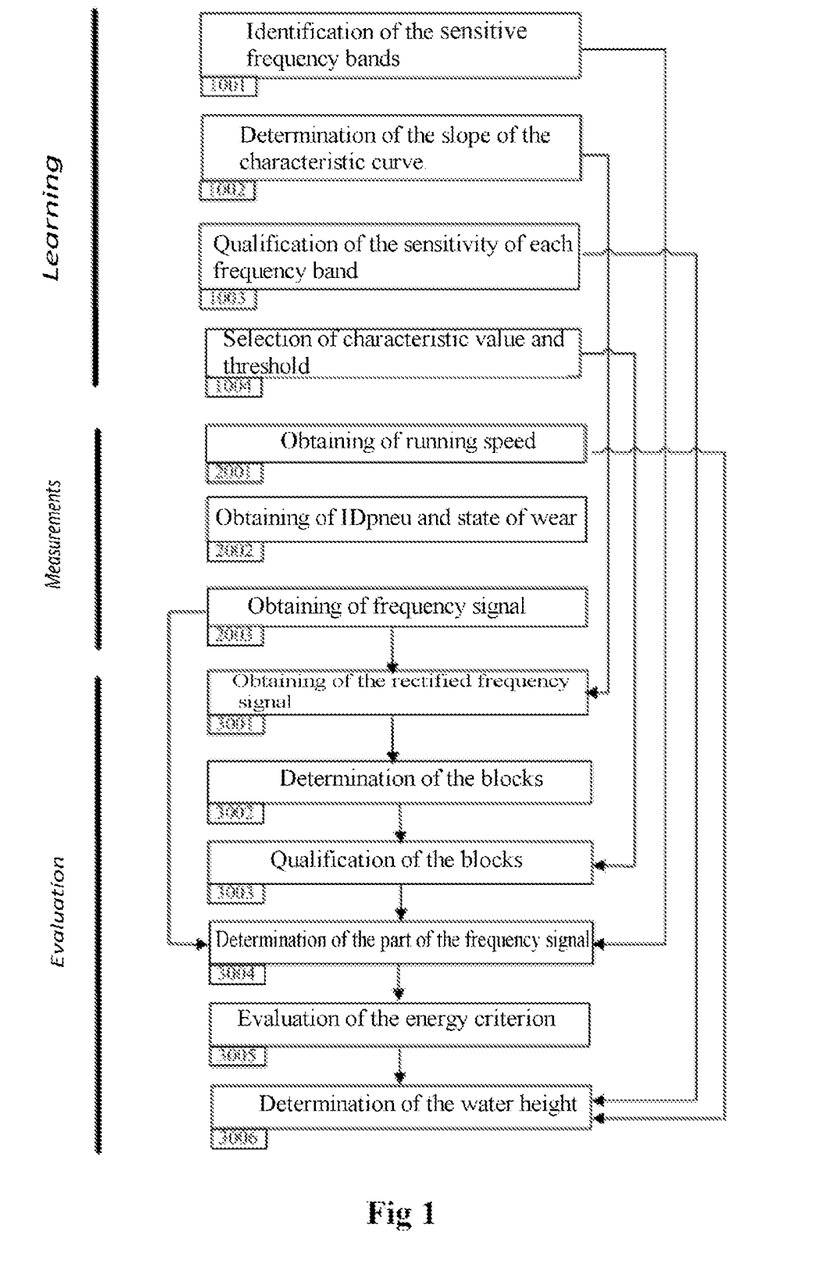
FIG. 1 presents a block diagram of the steps of the method for obtaining the water height.

FIG. 1 presents a block diagram of the method for evaluating water height on the roadway 1000. This is broken down into three main phases. A first learning phase consisting in performing the identification of certain parameters. A second phase of measurements on the vehicle consisting in recovering the information useful to the evaluation of the water height on the roadway where the vehicle is running. And finally, a third phase of evaluation consisting in determining the water height from the information collected during the preceding two phases.

The learning phase consists first of all in identifying the frequency bands sensitive to the water height 1001 in the sound response of the vehicle. This step consists in obtaining the noise spectra measured by the microphone fixed to the vehicle when the vehicle, equipped with a reference mounted set, runs on a roadway having various known water heights. To know the water heights, it is sufficient to employ a laboratory type measurement means known from the state of the art which will serve as benchmark. The rough nature of the roadway on which the vehicle is travelling is unimportant, particularly on a millimetric scale. The nature and the state of the tyre with which the vehicle is equipped are unimportant. In fact, these parameters are of second order for the sound response of the vehicle to the water height on the roadway.

These various spectra first of all and optionally make it possible to determine the slope of the characteristic curve beyond 4 kHz according to the step 1002. For this determination, a simple linear regression of the spectrum over the complete frequency band of the spectrum or by pieces of frequency band is performed. This determination can be performed according to a single running condition of the vehicle or by an average according to the various running conditions tested.

By having performed measurements in various water-height conditions, it is possible to identify the frequency bands that exhibit strong response sensitivity, in particular to the level of the amplitude of the sound response, depending on the water height of the roadway. The result of this step 1001 is to be retained for the evaluation phase.

Finally, by having both observed the variation according to the height but also primarily according to the running speed, it is possible to qualify the sensitivity to these two parameters of each of the sensitive frequency bands according to the step 1003 by employing the energy criteria of the step 3003. Secondly, it is useful to qualify the sensitivity of the frequency bands according to the characteristics of the tyre and the state of wear of the tyre in a finer water height evaluation mode. Thirdly, and in an ideal mode, it is useful to evaluate the sensitivity of the frequency bands according to the texture of the roadway on which the tyre is running.

A multilinear function of the various parameters is then created, including at least the water height and the running speed continually describing the energy vector of the step 3003 and passing through the points measured in this step 1003. This function will be used in the step 3006 to determine the water height on the roadway as a function of the running speed of the vehicle and of the energy vector associated with the sound response of the vehicle.

Finally, the step 1003 requires the conditions for the energy criteria of the step 3003 to be defined in order to select the blocks that are useful to the analysis. Consequently, the step 1004 is performed, consisting in selecting, with respect to the frequency signal of the vehicle, the characteristic values and the thresholds of the various blocks, of the future rectified frequency signal for example, which will be used in the evaluation phase in investigation mode.

The second phase consists in obtaining the information on the vehicle at the time when the vehicle is running on any roadway in a wet state without the water height being known.

In a first, optional step 2002, the tyre with which the vehicle is equipped should be identified and information on the state of wear thereof obtained. However, these data are ancillary and only necessary to enhance the accuracy of the final evaluation of the water height. On the other hand, it is necessary to evaluate the running speed of the vehicle at the moment of measurement on wet roadway according to the step 2001. An average value of the speed over the time of acquisition of the sound signal is sufficient.

The third phase is the evaluation phase which takes place embedded on the vehicle through a processor provided with a memory space and means of communication with the microphone or other members of the vehicle, in particular the tyre. These communication means can, for example, be a radio frequency transceiver for communicating with an RFID tag linked to the tyre or a TMS sensor installed on the tyre or a TPMS sensor installed on the mounted set. These communication means can also be a wired link with the microphone or the CAN bus of the vehicle. Thus, the processor can retrieve, on the one hand, all the useful information in the learning phase such as, for example, the sensitive frequency bands, the slope of the characteristic curve, the characteristic values and the thresholds of each sensitive frequency band. On the other hand, the processor can retrieve the running speed of the vehicle but also, potentially, the identification or the geometrical characteristics of the tyre with which the vehicle is equipped as well as the state of wear thereof through the mileage travelled by the tyre for example.

A first optional step of the evaluation phase consists in creating the rectified frequency signal. For that, combining the frequency signal of the measurement phase to the characteristic curve of the vehicle is preferable. However, the characteristic curve is defined by two parameters. On the one hand, the characteristic curve goes through an amplitude level at the frequency of 4 kHz which is a function of the water height and of the running speed and, on the other hand, the slope of the characteristic curve which is independent of the water height. This second parameter was evaluated in the learning phase in the step 1002. It is therefore appropriate, from the frequency signal obtained in the step 2003, to define the amplitude level at a given frequency, such as 4 kHz for example. For that, one method consists in linearising the frequency signal around the sampling frequencies of the frequency signal. Another method consists in defining this amplitude as the average value of the frequency signal over a frequency band around the target frequency of 4 kHz.

Depending on whether the work is done in linear scale or in logarithmic scale, the comparison consists either in establishing the ratio of the frequency signal to the characteristic curve or in establishing the difference between the two curves. Thus, the frequency signal rectified according to the step 3001 is obtained.

The second step 3002 consists in identifying the blocks of the frequency signal, optionally of the rectified frequency signal, beyond 4 kHz. For that, since the frequency signal is sampled, each of the samples should be compared to a value. For the rectified frequency signal, in the case where the work is done in linear scale, this specific value is the unity value. In the case where the work is done in logarithmic scale, the specific value is the zero value. A simple comparator between the contiguous samples makes it possible to identify the passage of the rectified frequency signal with respect to this specific value. When this passage is reflected by an overshoot above the specific value, that corresponds to the first point of a block. The last point of the block will be determined by a new passage of the rectified frequency signal below the specific value. Thus, it is possible to identify all the blocks of the rectified frequency signal which are responses of the rectified frequency signal above the specific value.

The step 3003 then consists in qualifying the identified block. The objective is to retain only blocks that have a strong sensitivity to the water height and for which the sound response is significant with respect to the sound response of the vehicle. Obviously, for this second aspect, it is easier to focus on the rectified frequency signal so as not to exclude the blocks in high frequencies.

This step 3003 consists first in assigning a metric to the block which is representative of the sound energy of the block while avoiding excessively highlighting very localised phenomena in the frequency domain. To this end, the maximum value of the block over the frequency band of the block is a first indicator. However, it does not necessarily reflect the form of the block enough, which is why an average value or a median value of the block will be preferred to it in a specific embodiment.

Then, this metric must be positioned with respect to a threshold in order to select only the blocks that have a strong contribution to the sound response of the vehicle. That makes it possible to enhance the sensitivity of the method and increase the separating power of the method. To this end, if a representation of the sound response of the vehicle is done in logarithmic scale, it is useful to employ as threshold a value of at least 3 dB which represents a doubling of the sound power of the block, which is significant. Obviously, this threshold can be further increased to reduce the analysis to a few blocks of the sound response to increase the separating or discriminatory power of the method.

The next step 3004 is a selection of the most significant blocks from the step 3003 in terms of sound power linked with the frequency bands sensitive to the water height identified in the step 1001. Thus, only the frequency bands of the blocks which are both audible with respect to the response of the vehicle and sensitive to the water height are retained. Ideally, only a single block is retained, but it is perfectly possible to select several of them. At the end of this step 3004, the part of the signal which will be used to determine the water height has been selected.

The step 3005 consists in creating an energy vector from the part of the signal selected in the preceding step. In the framework of our invention, the power spectral density is perfectly well indicated in terms of frequency signal. The energy vector then comprises the integral function of this power spectral density over the part of the signal, whether this be the frequency signal deriving from the microphone or the rectified frequency signal. In fact, the integral function is an indicator of the acoustic energy associated with a frequency band of a sound response. Obviously, if the part of the frequency signal is subdivided into several pieces, it is possible to calculate, for each frequency-continuous piece, an integral function of the response over the band of frequencies delimiting each piece. Then, each integral function can be an element of the energy vector. It is also possible to combine the various elements of the energy vector together by assigning each of them a specific weight in order to generate only a single element. The integral function of the part of the frequency signal will be evaluated in a representation of the sound signal in linear scale.

Finally, the step 3006 consists, from the energy vector of the step 3005, the running speed of the vehicle obtained in the step 2001, in evaluating the water height heau on the roadway where the vehicle is running. In fact, in the step 1003, a quantification of the various frequency bands sensitive to the water height was done by varying at least the water height and the running speed of the vehicle on any roadway making it possible to identify a function continuously describing the energy vector identified in the step 3005. This step 1003 of the learning phase makes it possible to evaluate the water height on the roadway from the running speed and from the energy vector identified in the step 3005 using at least bilinear function of the energy vector and running speed parameters.

Figure 2A:
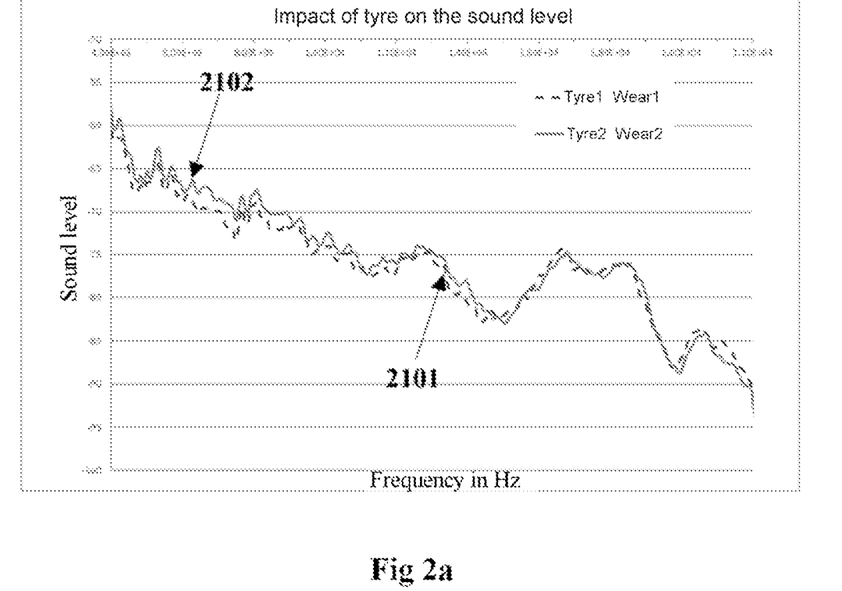
FIG. 2a, FIG. 2b and FIG. 2c present sound responses of the same vehicle running over a same water height equipped with tyres that are either different by the characteristics or different by their state of wear or identical but running on two different grounds.

FIG. 2a presents the sound responses of a vehicle running on a roadway having a determined water height with equal stabilized running conditions such as speed of displacement, inflation pressure, load carried. The dotted line curve 2101 represents the response of a first tyre characterized by a specific pattern of hollows of the tread of "all seasons" type, of V design. The continuous line curve 2102 represents the sound response of a second tyre which differs by its pattern of hollows from the first tyre by a design of "summer" type comprising 4 longitudinal furrows over the width of the tread. The sound responses of the two tyres are very close. However, based on the frequency bands, different behaviours are observed between the two tyres. In fact, the tyre of summer type emits more noise than the tyre of all-season type in a wide frequency band between 4 and 15 kHz. Then, beyond 15 kHz, the tyre of all-seasons type is noisier than the tyre of summer type. Although these variations of the sound behaviour of the two tyres are concrete, they remain negligible with respect to a variation of running speed or of water height on the roadway.

Figure 2B:
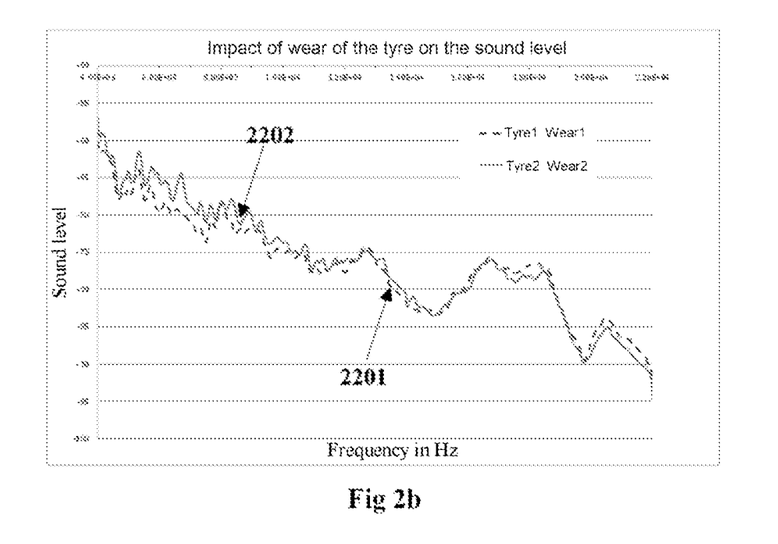

FIG. 2b represents the influence of the level of wear of the tread of a same tyre running on the same wet ground with equal running conditions. The dotted line curve 2201 represents the response of a first state of wear. The continuous line curve 2202 represents the sound response of the second state of wear of the tyre. Once again, the dynamic linked to the level of wear of the tyre is small. Furthermore, the sensitivity as a function of the frequency bands is reversed, notably at around 15 kHz.

Figure 2C:
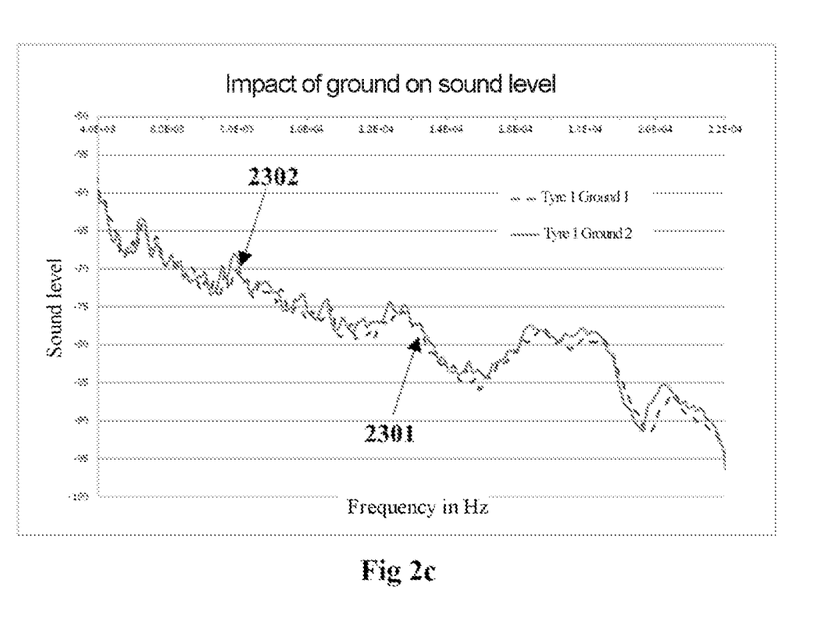

FIG. 2c represents the influence of the ground on the sound response of a same tyre running on the same water height with equal running conditions. The dotted line curve 2301 represents the response of the tyre on a first ground. The continuous line curve 2302 represents the sound response of the tyre running on the second ground. This time, the dynamic linked to the nature of the ground is small.

Figure 3A:
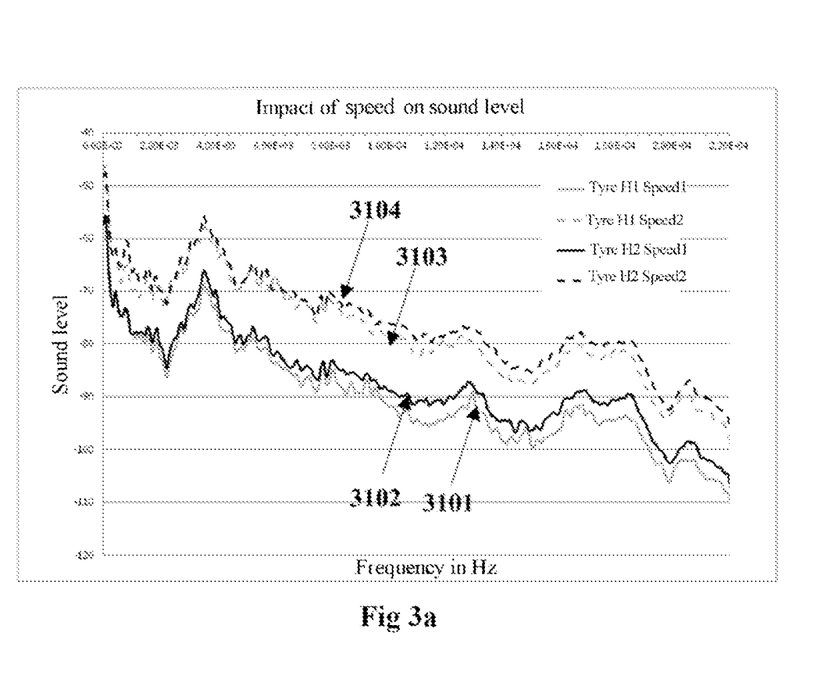
FIG. 3a presents sound responses of a vehicle running on a same water height equipped with the same tyres at two different running speeds.

FIG. 3a shows the sound responses of a vehicle equipped with the same tyres, in particular their level of wear, running on the same wet roadway, that is to say on a same water height. However, the continuous line curves 3101 and 3102 show the sound responses of the vehicle when the latter runs at 30 km/h on two different water heights. While the dotted line curves 3103 and 3104 show the sound responses when running at 100 km/h on the same two water heights. A very strong difference is noted, even more significant than for a variation of water height, between the sound responses as a function of the variable running speed, which makes it essential to take account at least of this parameter to estimate the water height on the roadway.

Figure 3B:
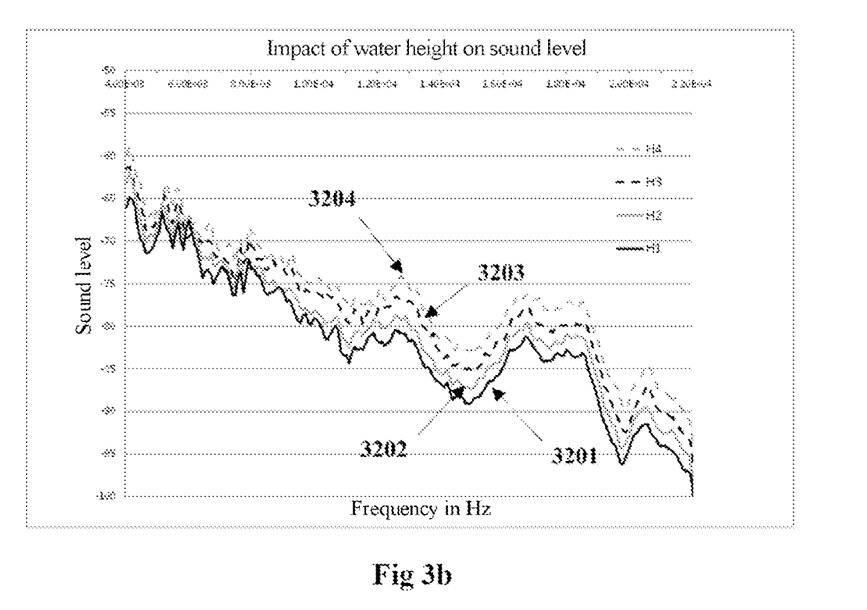
FIG. 3b presents sound responses of a vehicle running on different water heights equipped with the same tyres at the same running speeds.

FIG. 3b shows the sound responses of a vehicle equipped with the same tyres with equal running conditions. However, the roadway on which the vehicle is running has different water heights between the various sound responses ranging from 300 to 1500 micrometres. These heights were measured using a laboratory-type measurement device. This is for example the MARWIS 8900.U03 device from the company LUFT.

The increasing order of the numberings of the response curves between 3201 and 3204 corresponds to the increasing order of the water height on the roadway between 300 and 1500 micrometres by approximately 375 micrometre steps.

It will be noted that these curves are classified in terms of level of amplitude according to the water height on the roadway. The deviation between the curves is significant from 4 kHz. And, the more the frequency of observation of the sound responses increase, the more the deviation between the responses increases, noting in particular crossings of levels from 7 and 10 kHz. In fact, between 4 and 7 kHz, the dynamic according to the water height is less than 5 dB, between 7 and 10 kHz, the dynamic is greater than 5 decibels and less than 7 decibels. Beyond 10 kHz, a dynamic between the extreme curves is obtained that can reach and exceed 10 decibels.

Figure 4:
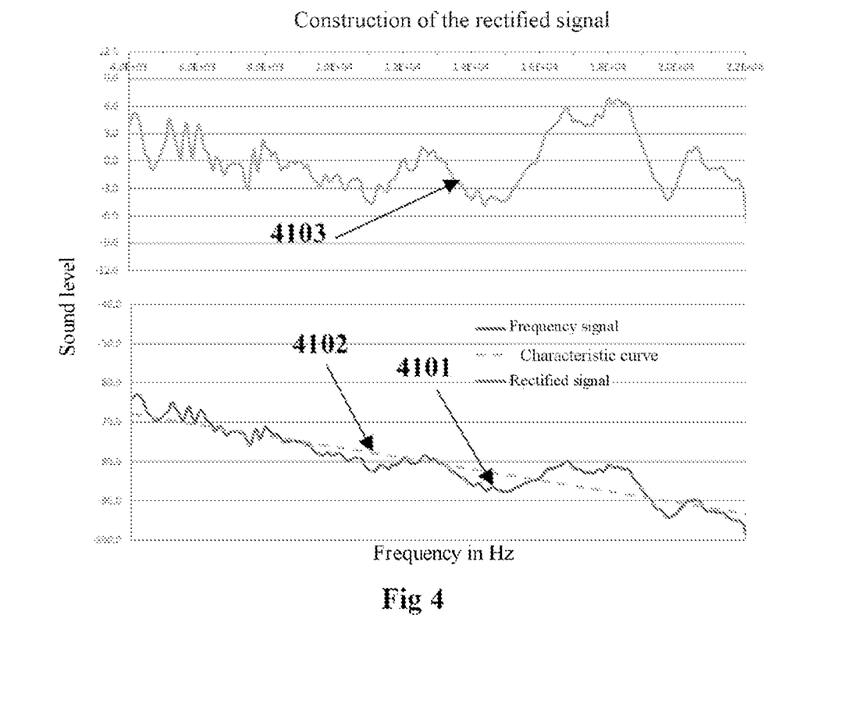
FIG. 4 presents a rectified frequency signal with identification of the blocks.

FIG. 4 illustrates the construction of a rectified frequency signal from a frequency signal according to a first preferential embodiment. After having identified the slope of the characteristic curve of the sound response of the vehicle according to the step 1002, the characteristic curve of the frequency signal associated with the running speed is constructed from the frequency signal recorded in the step 2003. For that, a reference point of this characteristic curve, or several points if the latter is defined piecewise, need to be identified. This reference point corresponds to the value for a given frequency of the characteristic curve associated with a running speed. Because of the lower response dynamic for the lowest frequencies, it is preferable to take this point in a band of frequencies lower than 7 kHz. Furthermore, it is possible to take the average value of the frequency signal over a band of frequencies insensitive to the water height identified in the step 1001 of the learning phase. The graph first of all shows the curve 4101 which is the frequency signal measured in the step 2003, the characteristic curve 4102, in dotted line, associated with the frequency signal which is, here, a linear curve whose slope over the 4 kHz to 22 kHz frequency band was identified in the step 1002 and for which a reference point at 4 kHz was evaluated as the median value over a frequency band weakly sensitive to the water height around 4 kHz according to the step 1001. The rectified frequency signal represented by the fat grey line curve 4103 is obtained by the difference, in logarithmic scale, between the frequency signal 4101 and the characteristic curve 4102.

Figure 5:
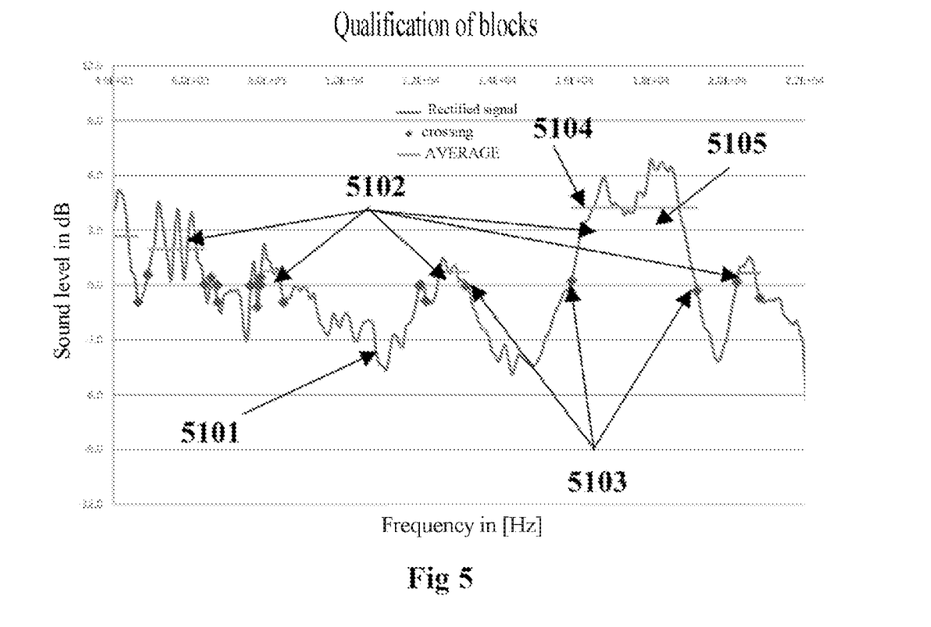
FIG. 5 illustrates the method for qualifying blocks over the rectified frequency spectrum.

FIG. 5 represents the rectified frequency signal 5101. The latter oscillates around the zero value in logarithmic representation. The first step consists in identifying the positive blocks 5102 in this rectified frequency signal. In fact, these so-called positive blocks are significant energy contributors of the sound response. To this end, each block situated above the zero value, delimited by two frequencies corresponding to the zero-value crossings 5103, is isolated. Next, the isolated blocks must be qualified through a simple metric 5104 representative of the sound energy of the block. To this end, the average value or the median value of the isolated block is a good estimator of the sound energy without being entirely preoccupied with the geometrical form of the block. The maximum value of the block is an indicator of the energy that is easy to implement but less well correlated to the total energy of a block. Finally, this estimator of the block must be compared to a threshold in order to retain only the highest energy blocks. To this end, a threshold of 3 dB above the zero value is a good indicator that makes it possible to retain only a few blocks. By retaining only these blocks 5105, there is an assurance of having a strong dynamic on the classification thus enhancing the discriminating power of the method.

After having identified the highest energy blocks, this selection must be combined with the blocks most sensitive to the water height. The combination of these two selections makes it possible to identify the block that is most promising for identifying the water height on the ground since it will at the same time be among the most sensitive to the water height ensuring that the discriminating power of the method is increased. However, this block will also be among the highest energy blocks that make it possible to identify the complete sound spectrum. Thus, an effective metric is constructed for identifying the water height on the roadway notably for water heights of less than 1.5 millimetre. This effective metric is the integral of the part of the frequency signal in linear scale delimited by the frequency band of the block which is both the highest energy and sensitive to the water height.

Finally, once this metric is evaluated and the running speed of the vehicle is identified for which the frequency signal was obtained, a bilinear function, identified in this step 1003, linking the water height on the roadway, the effective metric of the frequency signal and the running speed of the vehicle should be employed to identify the water height on the roadway. This bilinear function is, for example, the product of two functions of independent parameters. The independent parameters are, on the one hand, the running speed and, on the other hand, the effective metric which is the integral of the part of the frequency signal in linear scale. The result of this product is directly the water height on the roadway.

Figure 6:
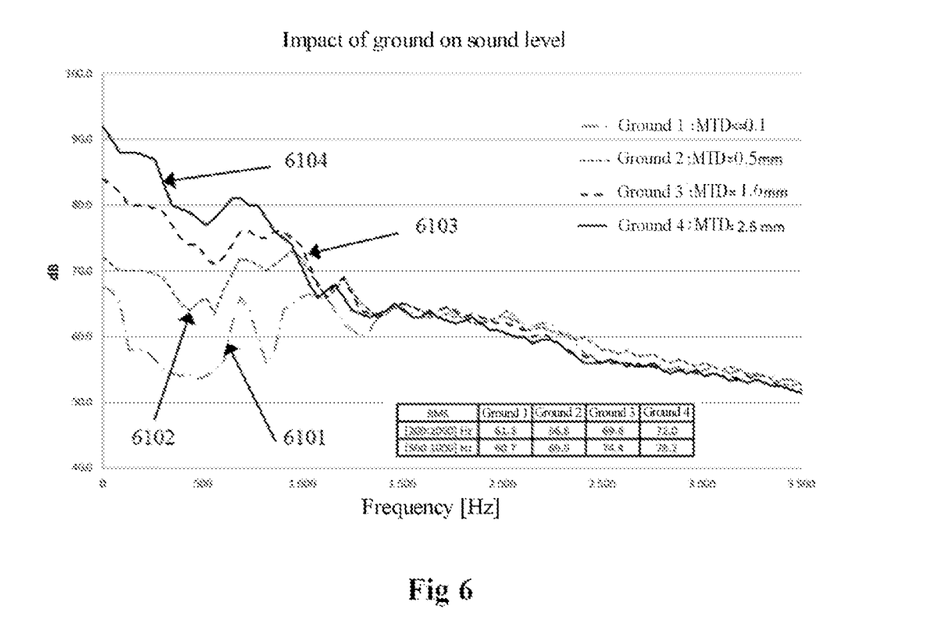
FIG. 6 illustrates the obtaining of the class of the texture of the roadway from a sound quantity.

FIG. 6 is a representation of the sound level expressed in decibel scale with a frequency pitch of several tens of hertz. This type of representation makes it possible to highlight the overall sound level while limiting the modes isolated from the mechanical components, whether that be the vehicle or the mounted set. In this case, the recordings correspond to a same running speed of the vehicle in a straight line. In order to limit the influence of the water on the roadway, the microphone measurement is performed on the rear part of the vehicle, for example at the wheel arch of the second axle of the vehicle. In this case, the residual water height on the roadway following the passage of the first axle of the vehicle is limited and the weight of this parameter becomes negligible on the sound level recorded by the microphone. Obviously, a measurement at the front axle can also be envisaged as long as the water height on the roadway is reasonable. The qualification of the texture of the roadway is relevant for low water heights less than 2 millimetres.

The curves 6101 to 6104 correspond to the sound signatures of various grounds of which the MDT (acronym for Mean Textured Depth) varies by less than 0.1 millimetre corresponding to a smooth ground up to 2.6 millimetres for a very rough ground, passing through two intermediate stages. At low frequencies, the curves are strongly differentiated. From 2 kHz, the sound signature of the roadway is overall more impacted by the texture of the roadway.

For each curve, the RMS (Root Mean Square) value of the sound signature is calculated over a band of frequencies sensitive to the texture of the roadway. Thus, for a given speed, the RMS value is associated with a class of texture of the roadway dictated by the MTD. Here, the RMS value is evaluated over two frequency bands, a wide window from 200 Hz to 2 kHz, and a narrow window from 500 Hz to 1 kHz. The classification of the sound signatures by the RMS value remains unchanged whatever the analysis frequency band. And, the deviation between the RMS values is significant and sufficiently discriminatory.

The invention claimed is:

1. A method for estimating a water height on a roadway where a tire is running, wherein a mounted set is assembled onto a vehicle and placed in a wheel arch of the vehicle, the method comprising the following steps:
    fixing a sensor onto the vehicle;
    obtaining a frequency signal, which is a signal corresponding to measurements of sound in terms of frequencies thereof, from the sensor corresponding to the running of the vehicle at running speed V on the roadway covered with water;
    isolating a part of the frequency signal, bounded by two frequencies F1 and F2, F1 being lower than F2, which is sensitive to the water height;
    determining an energy vector linked to the part of the frequency signal, such that the energy vector comprises an integral function of a power spectral density over either the part of the frequency signal or a rectified frequency signal, wherein the integral function is an indicator of acoustic energy associated with a frequency band of a sound response; and
    obtaining the water height on the roadway using a function taking account of the energy vector and the running speed V of the vehicle, wherein the water height is determined as a bilinear function of parameters for the running speed V and the energy vector associated with the sound response of the vehicle,
    wherein the sensor is a microphone, and
    wherein the frequency signal extends in total beyond 4 kHz.

2. The method according to claim 1, wherein the frequency signal corresponds to a power spectral density, determined in terms of sound power versus the frequencies of the frequency signal, of a discretized temporal signal from the microphone acquired while the vehicle is running.

3. The method according to claim 2, wherein the energy vector comprises the integral function of the power spectral density between the frequencies F1 and F2.

4. The method according to claim 1, wherein the part of the frequency signal is limited to at least one block of which a characteristic value is above a threshold relative to the frequency signal.

5. The method according to claim 4, wherein the energy vector comprises the integral function of the power spectral density over the rectified frequency signal,
    wherein the rectified frequency signal provides a comparison between the frequency signal and a characteristic curve of the frequency signal, and
    wherein the at least one block of the frequency signal is delimited by crossing of a specific value by the rectified frequency signal.

6. The method according to claim 4, wherein the step for isolating a part of the frequency signal comprises construction of a rectified frequency signal as being a comparison between the frequency signal and a characteristic curve of the frequency signal, and
    wherein the characteristic value of the at least one block lies in a group comprising a maximum value, an average value, or a median value.

7. The method according to claim 4, wherein the step for isolating a part of the frequency signal comprises construction of a rectified frequency signal as being a comparison between the frequency signal and a characteristic curve of the frequency signal, and
    wherein, the frequency signal being expressed in logarithmic scale, the threshold is a value 3 dB.

8. The method according to claim 1, wherein the step for isolating a part of the frequency signal comprises construction of the rectified frequency signal as being a comparison between the frequency signal and a characteristic curve of the frequency signal.

9. The method according to claim 8, wherein the characteristic curve of the frequency signal is continually decreasing beyond 4 kHz.

10. The method according to claim 1, wherein a sensitivity step of frequency bands of the frequency signal to the water height is performed, wherein the vehicle, equipped with the microphone, runs on a roadway having at least two water heights that can be differentiated, wherein the sensitivity step is performed in a learning step, the learning step including identification of the frequency bands, determination of a slope of a characteristic curve, qualification of sensitivity of each frequency band, and selection of a characteristic value and a characteristic threshold.

11. The method according to claim 1, wherein the method comprises a step of obtaining an identification of the tire from one or more selected from a group consisting of a label, a barcode, a QR code, an electronic device of RFID type, or an electronic device of TMS type, in order to obtain at least one geometrical characteristic of the tire, and the function of obtaining the water height takes account of the at least one geometrical characteristic of the tire.

12. The method according to claim 1, wherein the method comprises a step of obtaining a state of wear of the tire and the function of obtaining the water height takes account of the state of wear of the tire.

13. The method according to claim 1, wherein the method comprises a step of obtaining a texture of the roadway, and the function of obtaining the water height takes account of the texture of the roadway.

14. The method according to claim 1, wherein the fixing of the sensor takes place in the wheel arch.

15. The method according to claim 14, wherein the fixing of the sensor takes place in a rear part of the wheel arch with respect to a plane OYZ of the mounted set.

* * * * *